United States Patent [19]

Reed

[11] 3,829,552

[45] Aug. 13, 1974

[54] METHOD OF MASSIVELY HYDRIDING ZIRCONIUM-URANIUM ALLOY

[75] Inventor: Edward L. Reed, Woodland Hills, Calif.

[73] Assignee: North American Rockwell Corporation

[22] Filed: Oct. 12, 1962

[21] Appl. No.: 230,803

[52] U.S. Cl............ 423/255, 176/92, 252/301.1 R, 423/645
[51] Int. Cl......................... C01g 25/00, C01g 43/00
[58] Field of Search ...................................
    204/154.2–154.34, 193.2–193.34; 23/204;
    423/645, 255; 176/92; 252/301.1 R

[56]  References Cited
   UNITED STATES PATENTS

| 3,070,526 | 12/1962 | Merten | 204/154.2 |
| 3,019,176 | 1/1962 | McReynolds | 204/154.2 |
| 2,929,707 | 3/1960 | Weeks et al. | 204/154.2 |
| 3,018,169 | 1/1962 | Vetrano | 204/154.2 |

OTHER PUBLICATIONS

AEC Report BMI-1244 Apr. 23, 1958, pp. 11, 12 29 & 30.

2nd Geneva Conference on Atomic Energy, Vol. 6, pp. 111–115, Sept. 1958.

Nuclear Metallurgy, Vol. V, Oct. 1958, pp. 49–55.

Primary Examiner—Carl D. Quarforth
Assistant Examiner—Roger S. Gaither
Attorney, Agent, or Firm—Gerald A. Koris; L. L. Humphries

EXEMPLARY CLAIM

1. A process of massively hydriding a zirconium-uranium alloy fuel element, which comprises slowly heating the alloy in a vacuum to a temperature of about 1,500°–1,850°F., contacting said alloy with hydrogen until a preselected H/Zr ratio is obtained at a pressure substantially greater than atmospheric, isochorically cooling the resulting composition to at least a temperature no higher than approximately 1,390°F., and then cooling said composition to ambient conditions.

9 Claims, 1 Drawing Figure

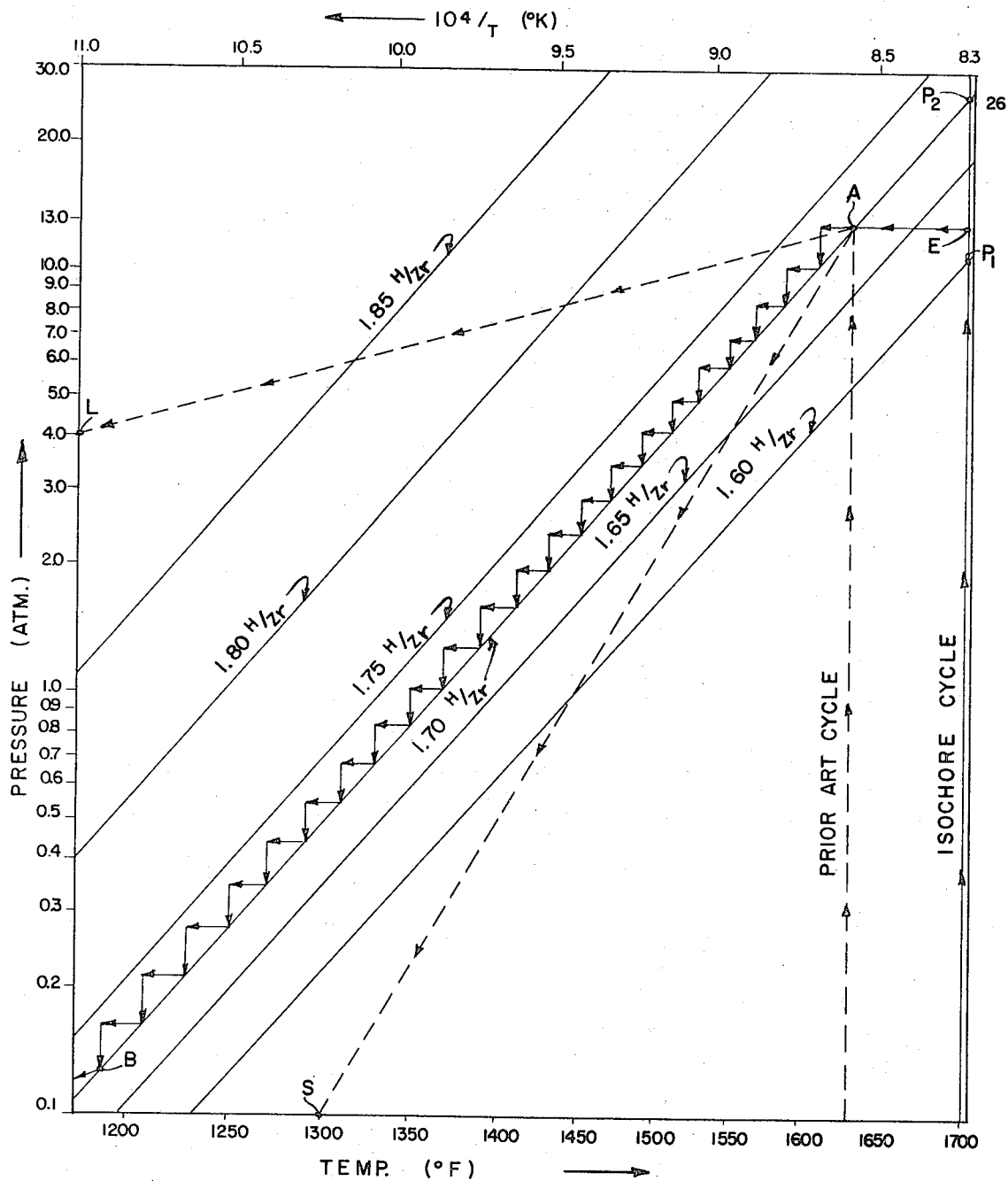

METHOD OF MASSIVELY HYDRIDING ZIRCONIUM-URANIUM ALLOY

My invention relates to a method of massively hydriding zirconium-uranium alloy, and more particularly to a method of massively hydriding such alloy to a high hydrogen density in crack-free form.

Zirconium hydride is an excellent neutron moderating material for a nuclear reactor, particularly where cores of small diameter or high power density are required. Hydrogen has the greatest neutron slowing down ability of any element. When combined with zirconium, a structural metal of relatively low thermal neutron absorption cross section, a relatively stable, high density composition is obtained. Zirconium hydride may be used as the moderator material in both heterogeneous cores, and in homogeneous cores with the uranium intimately dispersed in the zirconium matrix. The homogeneous composition has many nuclear, fabricational, and heat transfer advantages; it has been employed to date in a number of reactor systems, such as the SNAP Reactor Series for nuclear auxiliary power in space devices.

The hydrogen content of zirconium-uranium alloy does not follow a fixed stoichiometry, but varies with the hydriding method employed. Since the moderating properties of the composition are dependent upon the hydrogen, the core size is directly proportional to the hydrogen concentration of the composition. The hydrogen content of zirconium hydride is normally expressed by the term $N_H$, which represents the number of hydrogen atoms per cubic centimeter. For example, $N_H = 5.0$ indicates that there are $5.0 \times 10^{22}$ atoms hydrogen per cc.

It is required of hydrides for use as compact reactor moderators that they retain a high hydrogen content, maintain their shape at elevated temperatures under irradiation, and have satisfactory fabrication characteristics. Powder compacts of uranium-zirconium hydride (see U.S. Pat. No. 2,929,707) are relatively easy to fabricate, but have a low density, are extremely brittle, have poor heat transfer characteristics, and are generally inferior as a structural material.

Metals hydrided in massive form can satisfy the requirements of power reactor operation. In hydriding zirconium or a zirconium base alloy, the metal absorbs a large amount of hydrogen and severe cracking or distortion frequently results, particularly in zirconium-uranium alloys where the hydride expands considerably upon formation. Further, it has been very difficult to control hydriding processes to reproducibly obtain a specific $N_H$. With the variation in the moderating properties of homogeneous fuel elements due to different hydrogen concentrations, there may be problems with irregular flux patterns across a reactor core.

Zirconium-uranium alloys (1–50 weight percent uranium) have been massively hydrided in the prior art by methods involving heating the alloys in a vacuum chamber to high temperature, and introducing purified hydrogen into the chamber until equilibrium was reached at a predetermined pressure. At such point the hydrogen flow was stopped, the furnace power cut, and the resulting hydrided bodies allowed to furnace cool to room temperature. Such prior art massive hydriding processes have a number of drawbacks. Hydrogen densities greater than approximately $N_H$ 4.5 cannot be obtained without severe cracking of the hydride product. Further, stoichiometry control is poor, unpredictable, and hydrides of a predetermined $N_H$ value cannot be routinely obtained. This is due in part to the prior art processes being greatly dependent upon the ratio of the total volume of the hydriding chamber to the volume of the alloy material being hydrided. For example, using a large hydriding chamber to hydride a small volume of zirconium-uranium alloy results in the absorption of large volumes of hydrogen into the alloy during furnace cooling. Other effects noted are that the resulting compositions are very erratic, depending upon rates of furnace cooling and upon the extent of surface contamination of the alloy after hydriding. Massively hydriding zirconium-uranium alloys in chambers which are essentially of the same dimensions as the specimen is unfeasible because of the high temperature requirement and the void volume introduced by the necessary vacuum and hydrogen lines. Experiments which were conducted massively hydriding bodies in such low void volume chambers were unsuccessful.

Accordingly, an object of my present invention is to provide an improved method of massively hydriding zirconium.

Another object is to provide a method of massively hydriding zirconium-uranium alloy to a high $N_H$ value.

Another object is to provide such a method wherein preselected $N_H$ values are consistently obtained.

Still another object is to provide a method of massively hydriding zirconium-uranium alloy wherein preselected $N_H$ values are obtained in crack-free bodies of high physical integrity.

Other objects and advantages of my invention will become apparent from the following detailed description.

In accordance with my present invention, zirconium may be massively hydrided by heating in hydrogen at elevated pressures and temperatures until a desired $N_H$ value has been obtained, and then isochorically cooling the resulting composition. The isochoric cooling closely controls the hydrogen concentration of the final product. An isochore is a constant composition line at any given dissociation pressure and temperature. Employment of my method yields zirconium hydride bodies of consistently high, preselected $N_H$ values, which are metallurgically sound and display none of the cracks or warpage associated with earlier methods.

The accompanying FIGURE is a graph showing the dissociation pressure isochores of zirconium hydride from a hydrogen to a zirconium atom ratio of 1.60 to a ratio of 1.85. These isochores were experimentally determined by a method which was essentially independent of chamber volume. The isochore lines for zirconium-uranium alloy hydrides are closely similar and are displaced somewhat to the right, the degree of displacement varying with the uranium content of the alloy. The pressure-temperature equilibrium isochore lines can be experimentally established for each particular zirconium-uranium alloy material which is to be hydrided, according to techniques now known to the art. The general effect of uranium in zirconium-uranium alloys is as a diluent since uranium hydride is unstable and does not exist at these high temperatures of hydriding. Thus, there are fewer atoms of zirconium per cubic centimeter of alloy than for pure zirconium. This raises the ratio of hydrogen atoms to zirconium-plus-uranium atoms required to obtain a corresponding hydrogen atom density.

Referring to the FIGURE, it is seen that hydrogen pressure, in atmospheres absolute, is plotted as the ordinate against temperature as the abscissa. The abscissa's temperature values are given in two scales. In the top scale the temperature is plotted as one over the temperature, in degrees Kelvin, times 10,000, which gives values between 8 and 10; these numbers are convenient to use as isochore designations. Corresponding equivalent values of temperatures in degrees Fahrenheit are indicated along the abscissa at the bottom. The pressure values along the ordinate are on a log scale for the reason that both theory and experiment demonstrate that one obtains straight line functions within the high density region by plotting log P against 1/T.

The present process can best be described with reference to the FIGURE. A zirconium specimen is placed in a vacuum chamber, sealed, and a vacuum drawn. The term "zirconium" as used herein is intended to include both zirconium metal and zirconium-uranium alloy. The specimen is heated to 1,700°F., which temperature may satisfactorily vary between about 1500° to 1850°F., and highly purified hydrogen is admitted into the chamber. The gas is absorbed very rapidly by the hot zirconium and there is no rise of pressure inside the chamber until an equilibrium condition is approached with the pressure of the hydrogen absorbed. The hydrogen gas is admitted at a rate of about 0.05 to 0.5 milligram per gram zirconium per hour with a rate of about 0.2 mgm. per hour being preferred. Flow rates as high as 0.5 mgm. of hydrogen per gram zirconium per hour may be used, but the yield of uncracked specimens is reduced, and therefore the rapid addition of hydrogen is preferably avoided. With such a hydrogen introduction rate the chamber pressure rises gradually along the 1700°F. ordinate until an equilibrium condition is established with the final hydrogen gas pressure at the source. With the source pressure at approximately 10.8 atmospheres, equilibrium is established at point $P_1$, the specimen equilibrates at a hydrogen level of approximately 1.60 atoms of hydrogen to one atom of zirconium. This hydrogen level value can be retained in the test specimen upon return to ambient condition by employing my isochoric cooling method, as will be described in detail below.

Difficulties are created when very high $N_H$ values are desired. For example, if an H-Zr ratio of 1.70 were desired, such could apparently be obtained by increasing the source of hydrogen gas pressure to approximately 26 atmospheres until a new equilibrium condition is established at point $P_2$. This direct approach is not satisfactory, however, due to equipment limitations; isothermal vacuum and pressure chambers which operate at 1,700°F. at 26 atmospheres absolute (approximately 380 p.s.i. absolute) are difficult to obtain. The desired objective can nonetheless be obtained by an indirect approach involving a period of isobaric cooling. The specimen is equilibrated at an intermediate temperature between $P_1$ and $P_2$, at point E (13 atmospheres). The furnace is then slowly cooled at such intermediate pressure until a desired isochore is reached. For example, the furnace temperature is reduced from E at a rate of approximately 25°F. per hour, while maintaining the constant pressure of 13 atmospheres absolute, until a new equilibrium is established at approximately 1,630°F. at point A on the 1.70 isochore. Relatively high hydrogen flow rates occur during isobaric cooling because hydrogen absorption is then very rapid. The hydrogen flow rate is adjusted to maintain constant pressure. Cooling rates of about 50°F. per hour may be used and will produce a fairly good yield of crack-free hydrided bodies, but the slower cooling rate of 25°F. per hour or less is preferred as producing a better yield of high quality material.

Equilibration is an important aspect of the present process, since it establishes the composition of the finished body, and therefore its method of determination will be explained. Equilibrium conditions are established at a given point in the hydriding process, say at point A, by closing the hydrogen supply line and observing the chamber pressure change with time. If the specimen is not at equilibrium with the hydrogen pressure inside the vessel, the specimen will absorp more hydrogen and the pressure will drop. In such a case, the hydrogen supply line is opened and the hydrogen pressure allowed to build back up to the preselected value inside the vessel, for example to 13 atmospheres absolute at point A. Equilibrium is considered to have been established when the pressure drop is insignificant after the supply line is closed for about one-half hour.

When the 1.70 isochore at point A has been reached through the intermediate isobaric cooling step described above (the reasons for not reaching point A directly along the 1,630°F. ordinate will be mentioned below), or a zirconium sample is hydrided to a lower H/Zr ratio which does not require intermediate isobaric cooling, then isochoric cooling can be initiated. The constant composition isochore can be maintained by lowering both the temperature and the hydrogen pressure in the chamber simultaneously in such a manner that the net or vector effect of the change remains on the selected isochore line. There is then no driving force on the specimen and the composition remains at the selected isochore.

In practice it is difficult to change simultaneously both the temperature and pressure variable in such a manner that there is no deviation from the isochore line. I find that the return to ambient conditions, as a practical measure, can be performed in a manner where the pressure and the temperature are separately, alternately changed in small step functions, thereby closing following the isochore. Such may be accomplished in one of the following ways. The temperature is first lowered by a small increment, and then the chamber hydrogen pressure reduced by a small increment to return the composition of the specimen back to the isochore line. This is shown in the FIGURE by the steps down the 1.70 isochore line. In another method the chamber hydrogen pressure is first reduced by a small increment, and the temperature then reduced by a suitable, small increment to re-establish position on the isochore line. Either practice is effective in maintaining the composition of the zirconium hydride at or near the desired H/Zr ratio level with only insignificant quantities of hydrogen entering into or leaving the specimen as cooling is continued. The first mentioned method, where the temperature is lowered first, followed by the incremental pressure reduction, is preferred since hydrogen is absorbed by the specimen upon a temperature reduction, which tends to lower the furnace pressure immediately, thereby simplifying the pressure adjustment and minimizing composition deviation from the isochore line.

The incremental temperature and pressure decreases are desirably small, in order to minimize deviations from the isochore composition. Further, a small decrease in temperature can be accomplished over a relatively shorter period of time than a larger temperature decrease and, in such a time interval, only an insignificant quantity of hydrogen is absorbed by the specimen before the pressure is adjusted to the isochore value. During the pressure reduction step, hydrogen diffuses out of the specimen until the composition returns to the original H/Zr ratio. The temperature reduction steps may satisfactorily vary between about 5°–40° F.; 10° steps are preferred. In the FIGURE, The isochoric cooling along the 1.70 isochore line is shown in 20-degree increments for purposes of illustration. The time required for each incremental temperature reduction depends upon the magnitude of the increment and the nature of the furnace, and will generally vary between about 5–30 minutes. It has been found, for example, that a 10° F. temperature reduction is satisfactorily obtained in approximately 10 minutes.

The incremental, alternate, temperature and pressure reduction steps along the isochore may be continued in the described manner until ambient conditions are reached. It has been found that the rate of hydrogen absorption at lower temperatures and pressures is very slow and, for this reason, furnace cooling may be employed to complete the return to ambient conditions without significant alteration of composition or introduction of stresses. For example, practice has shown that furnace cooling may be initiated below approximately 1,180°F. (point B on the 1.70 isochore line in the FIGURE), although the step-cooling process may be continued to lower temperatures before the furnace is shut off.

The unreproducibility of prior art methods of hydriding zirconium, apart from the integrity of the resulting bodies, can be usefully explained with reference to the FIGURE. Starting at the 1,630°F. ordinate, hydrogen is introduced at constant temperature until point A is realized. Point A was not directly reached in the illustration of my invention given above, but rather was obtained through an intermediate isobaric cooling step, because approaching point A along the lower temperature ordinate tends to produce more stress-ladden, unsatisfactory bodies than with the high temperature hydriding. Once point A is reached, prior art practice has been to cut furnace power and cool in an uncontrolled manner such as from A to point L (if the chamber-to-specimen volume ratio is high) or from A to S (where the chamber-to-specimen volume is low). If there is a large quantity of hydrogen gas available in the hydriding chamber when the power is cut (A to L case), practically all of the hydrogen is absorbed by the specimen and the region near the surface will become so high in hydrogen density that the specimen will fail by longitudinal or "watermelon" type fractures. If there is practically no void volume in the chamber the pressure may follow the curve from A to S, below the desired compositional line. Here, hydrogen would be evolved from the specimen and the product would be unhomogeneous from surface to center. In any case of uncontrolled cooling, it is seen that non-uniform, inferior, cracked bodies are frequently obtained.

The following example is offered to illustrate my invention in greater detail.

EXAMPLE

A zirconium-uranium alloy containing 10 weight percent uranium in zirconium was arc-melted and warm-extruded. The slug was ground to the dimensions indicated below and was hydrided according to my process to a hydrogen-plus-uranium ratio of 1.82 without any visible evidence of cracks in the hydrided specimen. This run is typical of many such runs which hve been made to produce zirconium-uranium hydride bodies with $N_H$ values of 6.2 and 6.5.

The experimental conditions and the data obtained are given in the Table below.

TABLE

Conditions
1. Heated in vacuum until 1,800°F. reached.
2. Hydrogen introduction at 1,800°F. and flow rate of 0.05 mgm. $H_2$/gm. Zr/hr. until a pressure of 14.6 Atm. Abs. obtained. (102 hours)
3. Isobaric cooling at constant 14.6 Atm. Abs. to 1600°F. in 25°F./hr increments. (8 hours)
4. Equilibrated at 1,600°F., 14.6 Atm. Abs. (2 hours)
5. Isochoric cooling to 1170°F. in 10°F./10 min. increments. (8 hours)
6. Total hydriding time: 120 hours.

Specimen Data

|  | Before Hydriding | After Hydriding |
|---|---|---|
| Diameter | 0.96 in. | 1.040 in. |
| Length | 11.00 in. | 11.062 in. |
| Weight | 824.70 gm. | 840.20 gm. |
| Gain in Weight |  | 15.50 gm. |
| Percent Hydrogen as Weight Gain |  | 1.84 % |
| Ground, Finished Specimen: |  |  |
| Weight in Air |  | 621.219 gm. |
| Weight in Water |  | 568.014 gm. |
| Volume by Displacement |  | 123.205 cc. |
| Calculated Density |  | 5.61 gm/cc |
| H to Zr plus U Ratio |  | 1.82 |
| $N_H$ (Hydrogen Density) |  | 6.22 |

The above example is only illustrative rather than restrictive of my invention, which should be understood to be limited only as is indicated in the appended claims.

I claim:

1. A process of massively hydriding a zirconium-uranium alloy fuel element, which comprises slowly heating the alloy in a vacuum to a temperature of about 1,500°–1,850°F., contacting said alloy with hydrogen until a preselected H/Zr ratio is obtained at a pressure substantially greater than atmospheric, isochorically cooling the resulting composition to at least a temperature no higher than approximately 1,390°F., and then cooling said composition to ambient conditions.

2. The method of claim 1 wherein said isochoric cooling is conducted by alternately decreasing the temperature and the pressure in small increments a plurality of times.

3. The method of claim 2 wherein the temperature is reduced first in each of said plurality of temperature-pressure reductions, and then the pressure is adjusted to maintain the H/Zr composition ratio.

4. A method of massively hydriding zirconium-uranium alloy, which comprises placing the alloy in a reaction chamber, drawing a vacuum on said chamber, slowly heating said alloy to a temperature of about 1,500°–1,850°F., introducing hydrogen into said chamber at a rate of about 0.05–0.5 mgm. hydrogen per gram alloy per hour until equilibrium is established at a hydrogen pressure of at least several atmospheres and a preselected H/Zr composition ratio is obtained in said alloy, isochorically cooling the resulting composition to at least a temperature no greater than about 1,390°F., and then slowly cooling said composition to ambient conditions.

5. The method of claim 4 wherein said isochoric cooling is conducted by alternately, successively reducing the temperature and the pressure in a plurality of cycles, wherein in each of said cycles the temperature is first reduced by about 5°–40°F. in about 5–30 minutes, and then the pressure is adjusted after each temperature reduction step to maintain the preselected H/Zr composition ratio.

6. A method of massively hydriding zirconium to a high $N_H$ value, which comprises slowly heating the zirconium in a vacuum, contacting the heated zirconium with hydrogen until a first preselected H/Zr composition ratio is obtained at a hydrogen pressure substantially greater than atmospheric, isobarically cooling the resulting zirconium hydride until a second, higher, preselected H/Zr ratio is reached, isochorically cooling said hydride having said second H/Zr ratio to at least a temperature no higher than about 1,390°F., thereby maintaining said second H/Zr ratio, and then cooling said hydride to ambient conditions.

7. The method of claim 6 wherein said isobaric cooling is conducted at a cooling rate no greater than about 50°F. per hour.

8. A process of massively hydriding a zirconium-uranium alloy fuel element, which comprises placing said alloy in a vacuum chamber, drawing a vacuum on the chamber, slowly heating the alloy to a temperature of about 1,500°–1,850°F., introducing hydrogen into said chamber at a rate of about 0.05–0.5 mgm. hydrogen per gram alloy per hour until a first, preselected H/Zr composition ratio is obtained, isobarically cooling the resulting composition to a second, higher, preselected H/Zr ratio at a cooling rate no greater than about 50°F. per hour, isochorically cooling said hydride having said second H/Zr ratio at least to a temperature no greater than about 1,390°F., the isochoric cooling comprising a plurality of cycles, each cycle comprising successively, alternately reducing the temperature and pressure in step functions to maintain said second H/Zr ratio, the temperature reductions being in about 5°–40°F. steps and the pressure being correspondingly adjusted to maintain said ratio, and then furnace-cooling said hydride composition to ambient conditions.

9. The method of claim 8 wherein said hydrogen introduction rate is about 0.2 mgm. per gram alloy per hour, the isobaric cooling rate is about 25°F. per hour, and the isochoric cooling reduction steps are of about 10°F.

* * * * *

UNITED STATES PATENT OFFICE
CERTIFICATE OF CORRECTION

Patent No. 3,829,552     Dated August 13, 1974

Inventor(s) Edward L. Reed

It is certified that error appears in the above-identified patent and that said Letters Patent are hereby corrected as shown below:

after [75] add:

-- [73] Assignee: The United States of America as represented by the United States Atomic Energy Commission, Signed and sealed this 5th day of November 1974.

(SEAL)
Attest:

McCOY M. GIBSON JR.
Attesting Officer

C. MARSHALL DANN
Commissioner of Patents